United States Patent
Takikawa et al.

(10) Patent No.: US 8,970,990 B2
(45) Date of Patent: Mar. 3, 2015

(54) DISK DRIVE SUSPENSION

(71) Applicant: NHK Spring Co., Ltd., Yokohama-shi, Kanagawa (JP)

(72) Inventors: Kenichi Takikawa, Aiko-gun (JP); Masao Hanya, Aiko-gun (JP); Toshiki Ando, Aiko-gun (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/929,634

(22) Filed: Jun. 27, 2013

(65) Prior Publication Data

US 2014/0022674 A1 Jan. 23, 2014

(30) Foreign Application Priority Data

Jul. 19, 2012 (JP) ................. 2012-160865

(51) Int. Cl.
  *G11B 21/20* (2006.01)
  *G11B 5/48* (2006.01)
  *G11B 5/596* (2006.01)
(52) U.S. Cl.
  CPC .............. *G11B 5/4813* (2013.01); *G11B 5/482* (2013.01)
  USPC ................... 360/294.4; 360/245.7; 360/245.9
(58) Field of Classification Search
  USPC .......................................... 360/294.4, 245.7
  See application file for complete search history.

(56) References Cited

U.S. PATENT DOCUMENTS

| | | | |
|---|---|---|---|
| 6,266,212 B1 * | 7/2001 | Coon | 360/234.5 |
| 6,462,911 B1 * | 10/2002 | Tokuyama et al. | 360/245.7 |
| 6,757,137 B1 * | 6/2004 | Mei | 360/245.7 |
| 6,980,400 B2 * | 12/2005 | Girard | 360/245.7 |
| 7,307,817 B1 * | 12/2007 | Mei | 360/245.7 |
| 7,386,932 B2 * | 6/2008 | Girard | 29/603.06 |
| 7,459,211 B2 * | 12/2008 | Shih et al. | 428/412 |
| 8,027,128 B2 * | 9/2011 | Muraki et al. | 360/245.3 |
| 8,102,627 B2 * | 1/2012 | Muraki et al. | 360/245.7 |
| 8,130,470 B2 * | 3/2012 | Muraki et al. | 360/245.3 |
| 8,134,804 B2 * | 3/2012 | Honzawa et al. | 360/245.3 |
| 8,179,745 B2 | 5/2012 | Nakamura et al. | |
| 8,488,281 B1 * | 7/2013 | Pan | 360/294.4 |
| 8,493,689 B2 * | 7/2013 | Virmani et al. | 360/245.3 |
| 2004/0008449 A1 * | 1/2004 | Girard | 360/245.7 |
| 2008/0144223 A1 * | 6/2008 | Muraki et al. | 360/244.8 |
| 2011/0090600 A1 * | 4/2011 | Feng | 360/245.3 |
| 2011/0096438 A1 | 4/2011 | Takada et al. | |
| 2011/0149440 A1 * | 6/2011 | Uematsu et al. | 360/245.3 |
| 2012/0002329 A1 * | 1/2012 | Shum et al. | 360/294.4 |

FOREIGN PATENT DOCUMENTS

| | | |
|---|---|---|
| JP | 2010-146631 A | 7/2010 |
| JP | 2010-218626 A | 9/2010 |

* cited by examiner

*Primary Examiner* — Will J Klimowicz
(74) *Attorney, Agent, or Firm* — Holtz, Holtz, Goodman & Chick PC (57) ABSTRACT

A slider and microactuator elements are disposed on a gimbal portion of a flexure. A first end portion of each of the elements is secured to a first supporting portion. A second end portion is secured to a second supporting portion. A ground-side conductor is provided on the second supporting portion. A limiter member consists mainly of a resin shared with an insulating layer of a conductive circuit portion. The limiter member comprises a grounding junction, a first bridge portion, and a second bridge portion. The grounding junction is secured to the second supporting portion. The first bridge portion extends in a first direction from the grounding junction. The second bridge portion extends in a second direction from the grounding junction.

8 Claims, 12 Drawing Sheets

DISK DRIVE SUSPENSION

CROSS-REFERENCE TO RELATED APPLICATIONS

This application is based upon and claims the benefit of priority from prior Japanese Patent Application No. 2012-160865, filed Jul. 19, 2012, the entire contents of which are incorporated herein by reference.

BACKGROUND OF THE INVENTION

1. Field of the Invention

This invention relates to a disk drive suspension comprising a microactuator element of, for example, lead zirconate titanate (PZT).

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks of the disk about the pivot by a positioning motor, such as a voice coil motor.

A suspension is mounted on the actuator arm. The suspension comprises a load beam and flexure superposed thereon. A slider, which constitutes a magnetic head, is mounted on a gimbal portion formed near the distal end of the flexure. The slider is provided with elements (transducers) for accessing data, that is, for reading or writing data. The load beam, flexure, slider, etc., constitute a head gimbal assembly.

In order to overcome the increase in the recording density of disks, the magnetic head should be more precisely positioned relative to the recording surface of each disk. To attain this, dual-stage-actuator (DSA) suspensions have been developed that combine a positioning motor (voice coil motor) and microactuator element made of a piezoelectric material, such as lead zirconate titanate (PZT).

The distal end of the suspension can be quickly moved by an infinitesimal distance in a sway direction (or transversely relative to tracks) by applying a voltage to and thereby deforming the actuator element. As disclosed in Jpn. Pat. Appln. KOKAI Publications Nos. 2010-146631 (Patent Document 1) and 2010-218626 (Patent Document 2), moreover, there are known DSA suspensions in which a microactuator element is disposed on a gimbal portion of a flexure.

In a head gimbal assembly in which a slider and microactuator element are disposed on a gimbal portion, a tongue is formed such that the slider is mounted thereon. This tongue abuts a supporting protrusion (e.g., a convex surface of a dimple) formed on, for example, a load beam. The tongue is swingably supported on the load beam by the supporting protrusion. The tongue may sometimes strongly vibrate if the suspension is subjected to external mechanical shock or the like. Further, the tongue may separate from the dimple (dimple separation). To prevent such trouble, a limiter member is conventionally provided between the tongue and a supporting member, as disclosed in Patent Documents 1 and 2, for example.

The limiter member can effectively prevent vibration of the tongue if it is provided in a position where the tongue vibrates strongly. If the limiter member is connected in such a position, the junction between the tongue and limiter member may possibly be peeled off by stress repeatedly applied thereto.

BRIEF SUMMARY OF THE INVENTION

Accordingly, the object of this invention is to provide a disk drive suspension comprising a limiter member capable of effectively suppressing vibration of a tongue and configured so that the limiter member can be reliably secured to a supporting portion.

A disk drive suspension according to an embodiment comprises a load beam and a flexure formed of a metal base. The flexure comprises a stationary part secured to the load beam and a gimbal portion on which the slider is mounted. Microactuator elements each comprising a first end portion and a second end portion are disposed on either side of the slider. The flexure comprises an arm portion connecting with the stationary part, a pair of first supporting portions, a pair of second supporting portions, and a tongue on which the slider is mounted. The respective first end portions of the pair of microactuator elements are secured individually to the pair of first supporting portions. The respective second end portions of the pair of microactuator elements are secured individually to the pair of second supporting portions. Further, the suspension comprises a supporting protrusion (e.g., a convex surface of a dimple), swingably supporting the tongue relative to the load beam, a conductive circuit portion, ground-side conductors provided individually on the second supporting portions, and limiter members. The conductive circuit portion comprises an insulating layer of an electrically insulating resin and a conductor formed on the insulating layer. The ground-side conductors electrically connect the metal base of the flexure and respective electrodes of the microactuator elements. The limiter members each comprise a grounding junction secured to the second supporting portion corresponding thereto and a bridge portion extending outwardly relative to the tongue from the grounding junction and connected to the arm portion.

According to the arrangement of this embodiment, the limiter members can suppress excessive vibration of the gimbal portion and dimple separation. The slider and microactuator elements are mounted on the gimbal portion. The grounding junctions of the limiter members are secured to the second supporting portions that support the second end portions of the microactuator elements. Accordingly, vibration of the tongue can be effectively prevented. Since the ground-side conductors are provided on the second supporting portions, moreover, the grounding junctions of the limiter members can be firmly secured by the ground-side conductors and the metal base at the second supporting portions. Thus, the grounding junctions of the limiter members can be kept from separating from the second supporting portions even when the second supporting portions are frequently moved by vibration of the tongue.

In the embodiment described above, the limiter members consist mainly of the resin shared with the insulating layer, and the respective grounding junctions of the limiter members may integrally connect with a part of the insulating layer on the second supporting portions. An example of each of the limiter members comprises a first bridge portion and a second bridge portion. The first and second bridge portions extend in first and second directions, respectively, from the grounding junction and are connected to the arm portion.

The tongue may comprise a first tongue portion, a second tongue portion, and a hinge portion. The first tongue portion is formed between the pair of first supporting portions. A leading-side portion of the slider is disposed for movement on the first tongue portion. The second tongue portion is formed between the pair of second supporting portions. A trailing-side portion of the slider is secured to the second tongue portion. The hinge portion is formed between the first and second tongue portions. The hinge portion is narrower than the first and second tongue portions and pivotably connects the tongue portions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A disk drive suspension according to a first embodiment of the present invention will now be described with reference to FIGS. 1 to 13.

Figure 1:
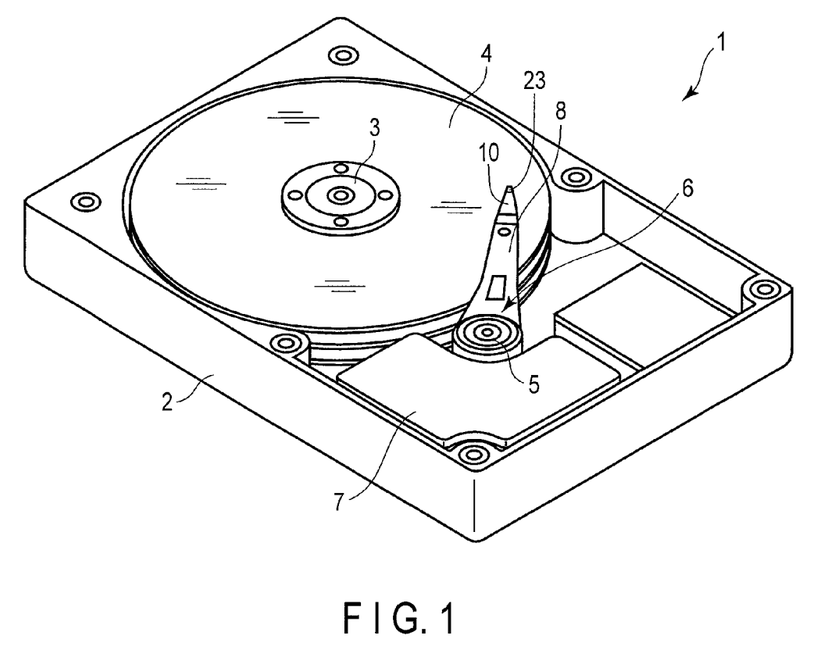
FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) 7 for actuating the carriage 6, etc. The case 2 is sealed by a lid (not shown).

Figure 2:
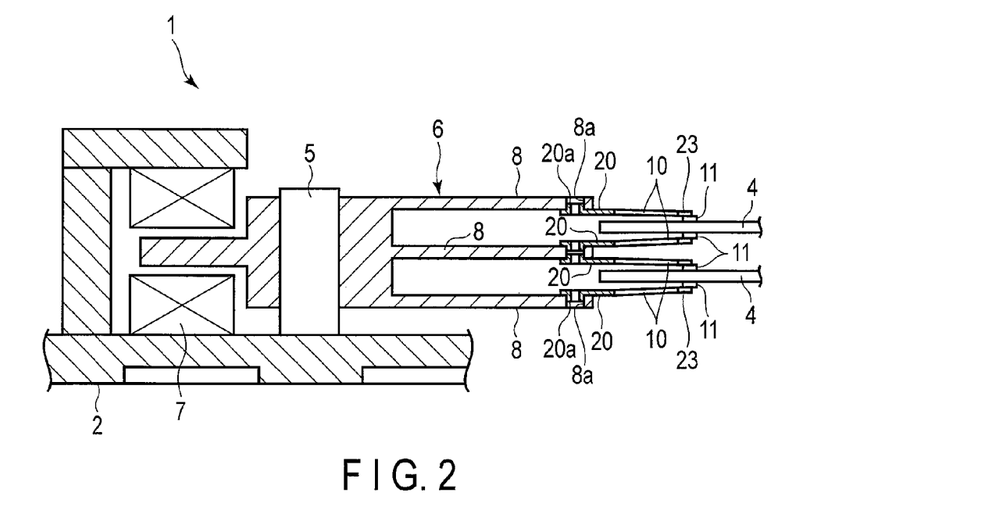
FIG. 2 is a partial sectional view of the disk drive shown in FIG. 1.

FIG. 2 is a sectional view schematically showing a part of the disk drive 1. As shown in FIGS. 1 and 2, the carriage 6 comprises arms (carriage arms) 8. A suspension 10 is mounted on the distal end portion of each arm 8. A slider 11, which constitutes a magnetic head, is provided on the distal end portion of the suspension 10. In a state where each disk 4 rotates at high speed, an air bearing is formed between the disk and the slider 11 as air flows in between the disk 4 and slider 11. If the carriage 6 is turned by the positioning motor 7, the suspension 10 moves radially relative to the disk 4. Thereupon, the slider 11 moves to a desired track of the disk 4.

Figure 3:
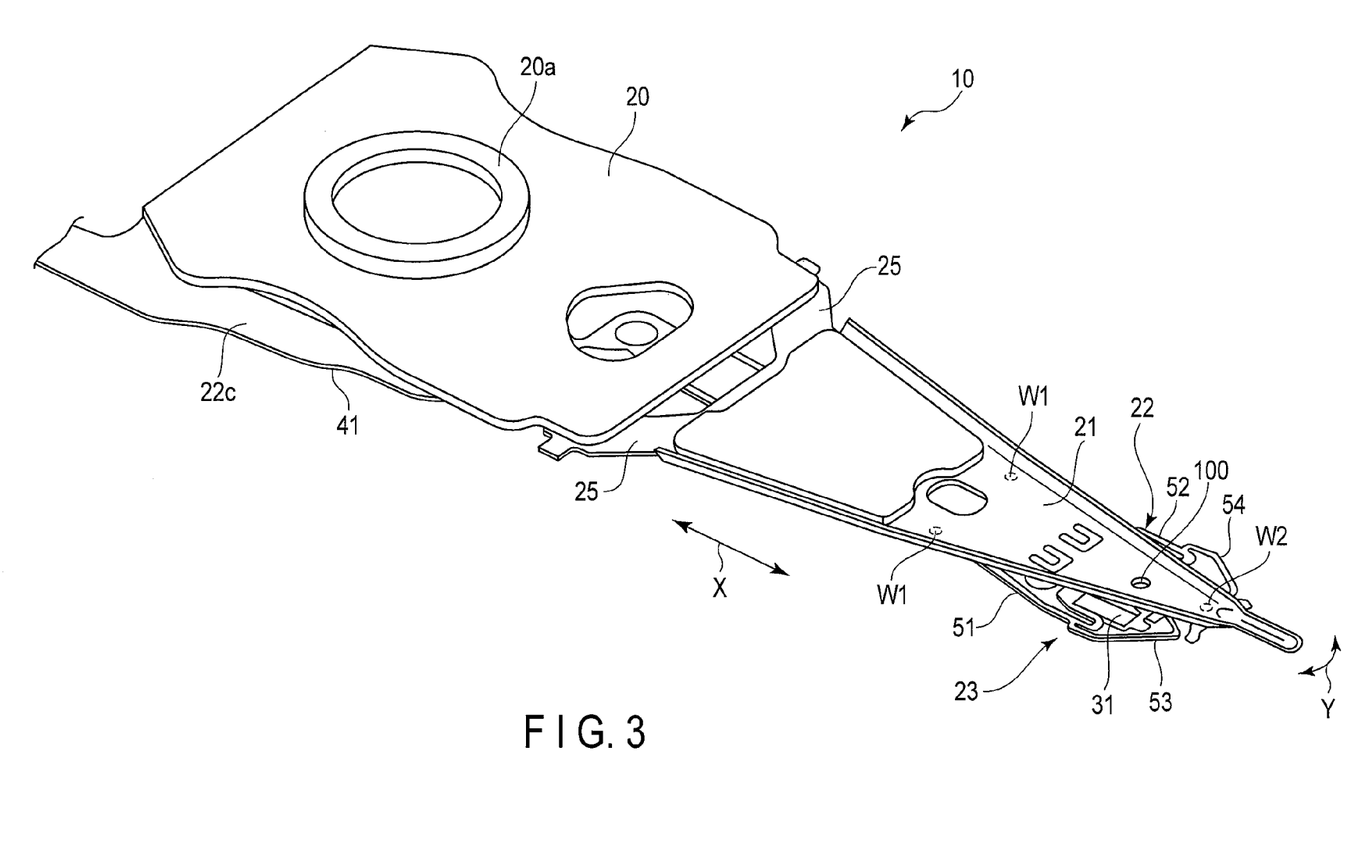
FIG. 3 is a perspective view of a suspension according to a first embodiment.

FIG. 3 shows the suspension 10 of the dual-stage-actuator (DSA) type. This suspension 10 comprises a baseplate 20 secured to its corresponding arm 8 (FIGS. 1 and 2) of the carriage 6, load beam 21, flexure 22 with conductors, microactuator mounting section 23 located near the distal end of the suspension 10, etc. A boss portion 20a to be inserted into a hole 8a (FIG. 2) in each arm 8 is formed on the baseplate 20.

In FIG. 3, arrows X and Y indicate the longitudinal direction of the load beam 21, that is, the longitudinal direction (front-rear direction) of the suspension 10, and a sway direction (transverse direction of the slider 11), respectively. Spring portions 25 capable of thicknesswise springy deformation are formed on the proximal portion (rear end portion) of the load beam 21. The flexure 22 is disposed along the load beam 21.

Figure 4:
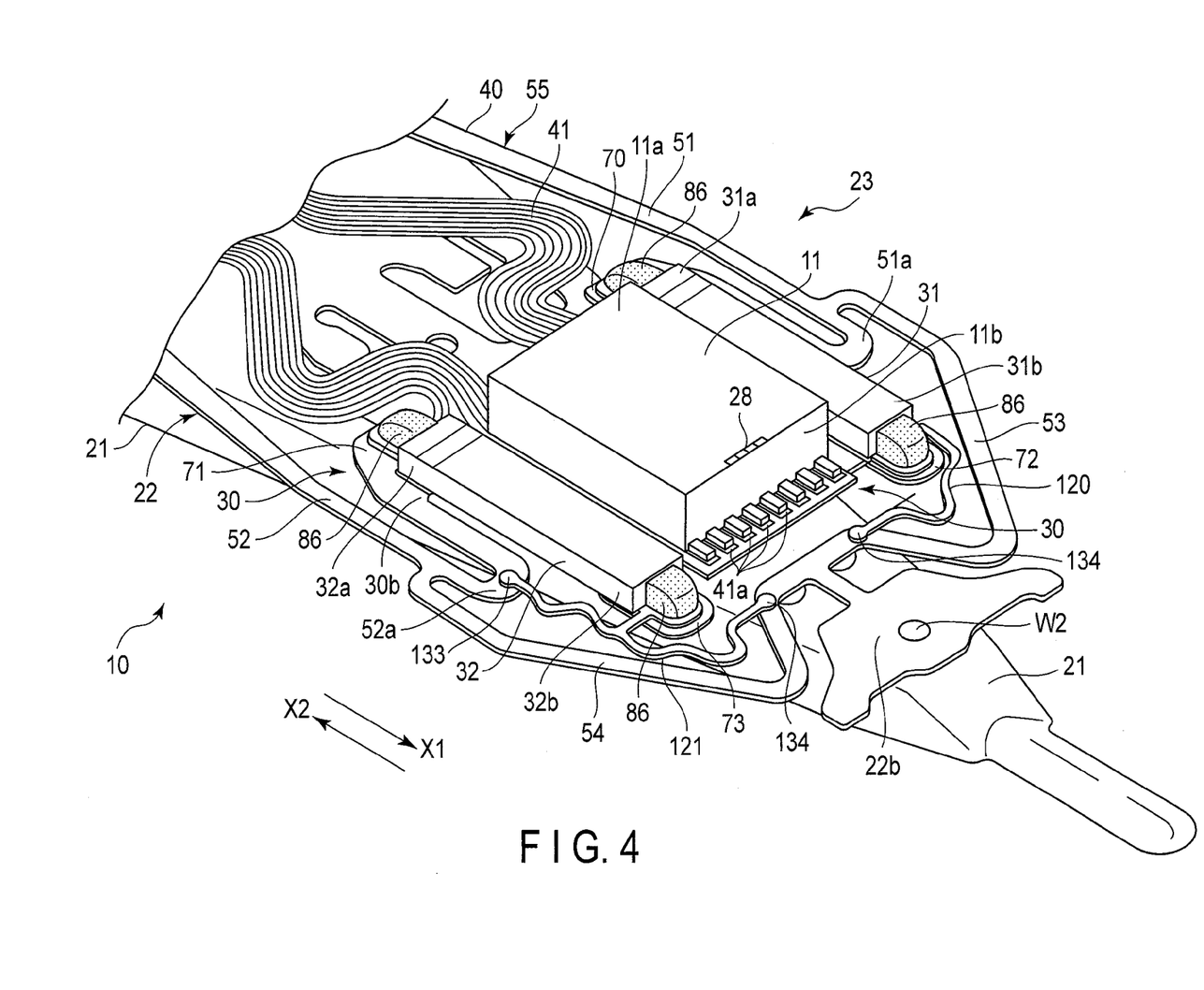
FIG. 4 is a perspective view of a microactuator mounting section of the suspension of FIG. 3 taken from a slider.

FIG. 4 is a perspective view of the microactuator mounting section 23 taken from the side of the slider 11. Microactuator mounting section 23 is disposed on the distal end portion of the suspension 10. Elements 28, such as magnetoresistive (MR) elements capable of conversion between magnetic and electrical signals, are disposed on an end portion of the slider 11 that constitutes the magnetic head. These elements 28 serve to access data, that is, write or read data to or from the disk 4. The slider 11, load beam 21, flexure 22, etc., constitute a head gimbal assembly.

Microactuator mounting section 23 comprises a gimbal portion 30 formed on the distal end portion of the flexure 22 and a pair of microactuator elements 31 and 32. These microactuator elements 31 and 32 are disposed individually on the opposite sides of the slider 11 on the gimbal portion 30. Microactuator elements 31 and 32 are formed of piezoelectric plates of PZT or the like and have the function of pivoting the slider 11 in the sway direction by means of a structure described in detail later.

Figure 5:
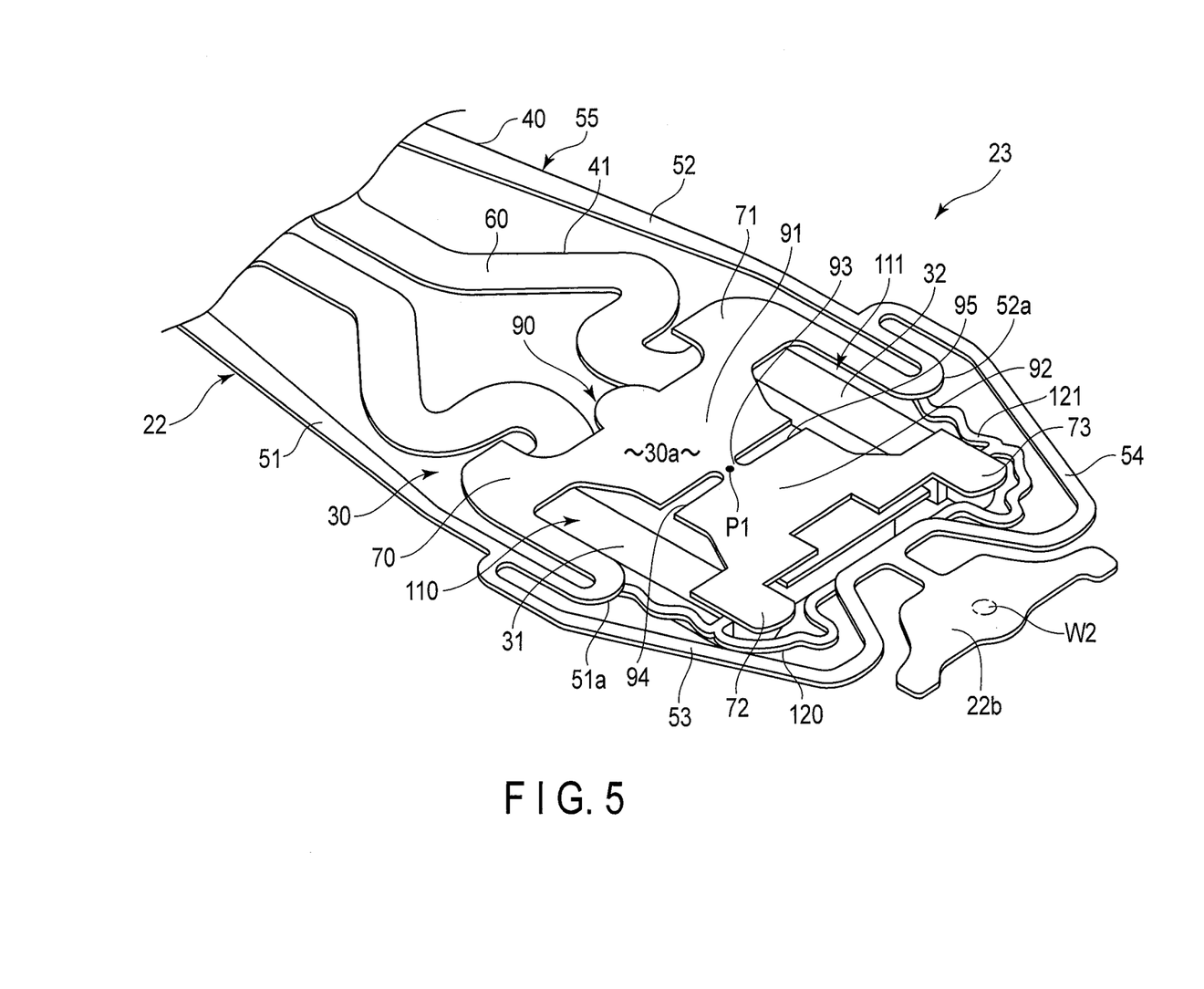
FIG. 5 is a perspective view of the microactuator mounting section of FIG. 4 taken from a tongue.
Figure 6:
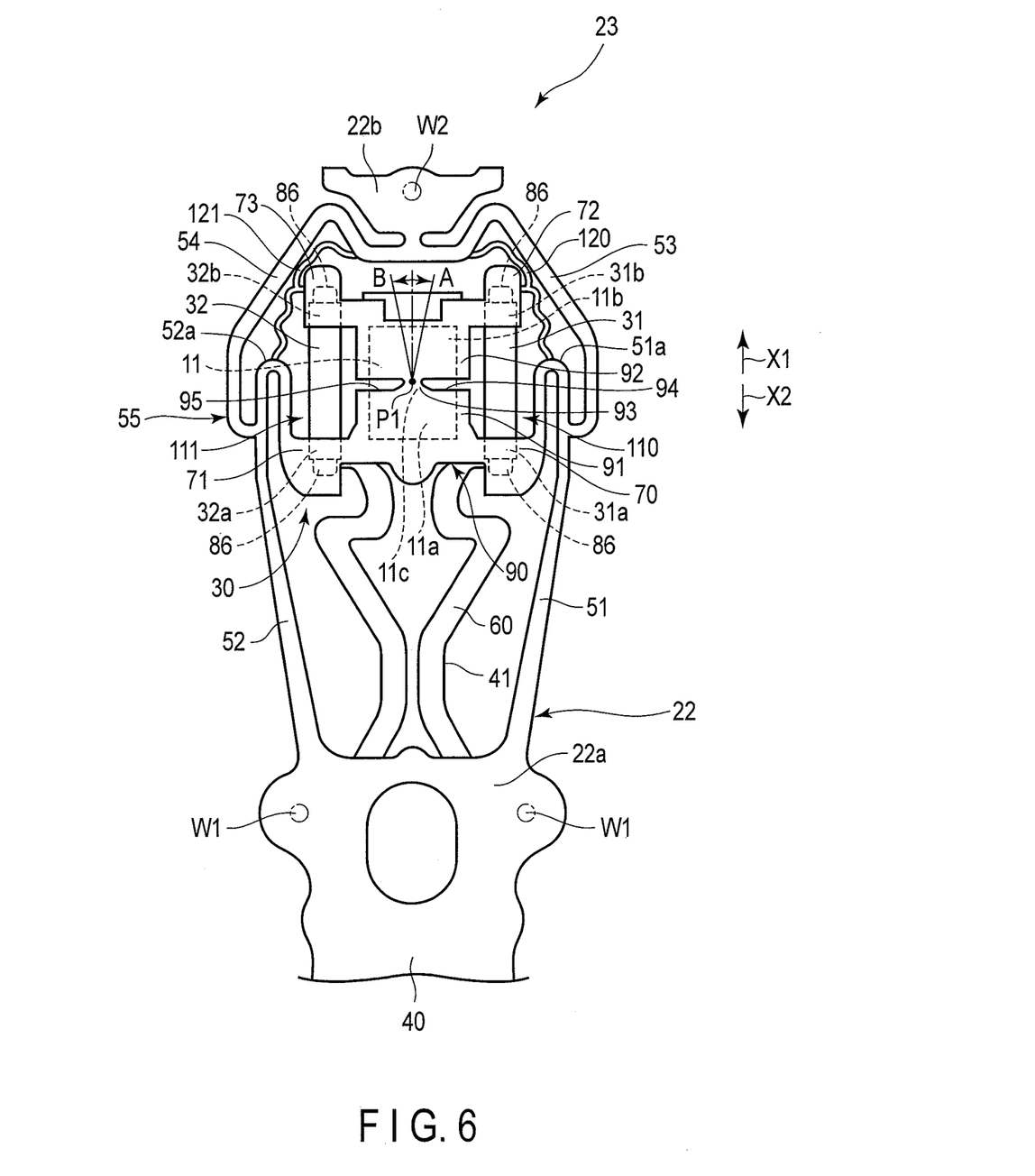
FIG. 6 is a plan view of the microactuator mounting section of FIG. 5.
Figure 7:
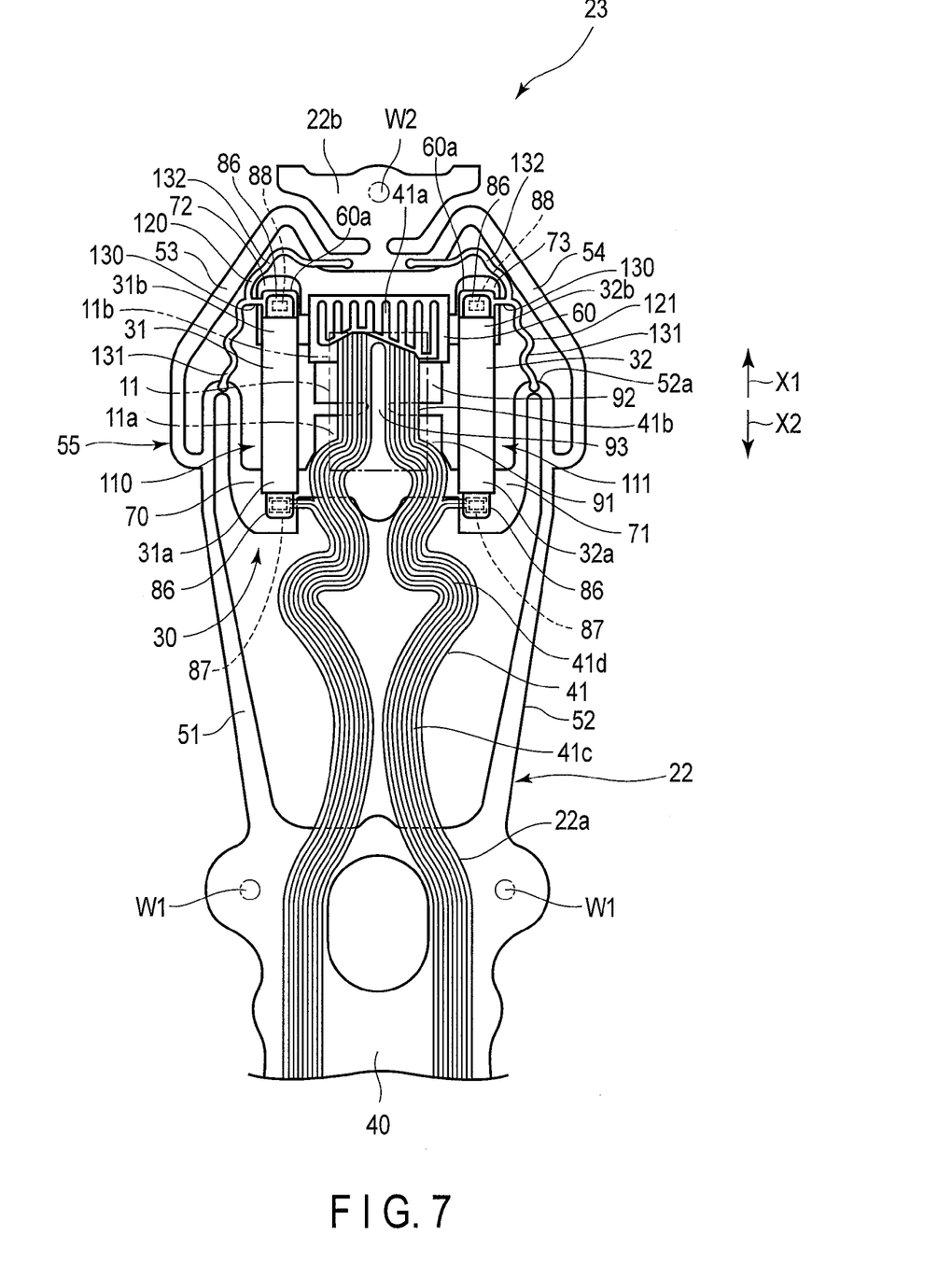
FIG. 7 is a bottom view of the microactuator mounting section of FIG. 5 taken from the side opposite to FIG. 5.

FIG. 5 is a perspective view of the gimbal portion 30 on the distal end portion of the flexure 22 taken from the side opposite to FIG. 4. Microactuator elements 31 and 32 are disposed on the gimbal portion 30. FIG. 6 is a plan view showing the gimbal portion 30 and microactuator elements 31 and 32. The flexure 22 comprises a metal base 40, formed of a stainless-steel plate, and a conductive circuit portion 41. The conductive circuit portion 41 is disposed along the metal base 40. The conductive circuit portion 41 comprises a part overlapping the metal base 40 and a part not overlapping the metal base 40. FIG. 7 is a bottom view of the microactuator mounting section 23 taken from the side of the conductive circuit portion 41.

The metal base 40 is secured to the load beam 21. An example of fixing means comprises first welds W1 (FIGS. 3, 6, etc.) and a second weld W2 (FIGS. 3 to 7) formed by laser welding. The flexure 22 comprises first and second stationary parts 22a and 22b. The first stationary part 22a is secured to the load beam 21 by weld W1 at a front-rear intermediate portion of the suspension 10. The second stationary part 22b is secured to the load beam 21 by weld W2 in a position near the distal end of the flexure 22. A rear portion 22c (FIG. 3) of the flexure 22 extends rearward from the baseplate 20.

As shown in FIGS. 5 to 7, the metal base 40 of the flexure 22 comprises a pair of first arms 51 and 52 and a pair of second arms 53 and 54. The first arms 51 and 52 connect with the first stationary part 22a, and the second arms 53 and 54 with the second stationary part 22b. Respective distal end portions 51a and 52a of the first arms 51 and 52 are U-shaped. The respective rear ends of the second arms 53 and 54 are connected to the vicinity of the distal end portions 51a and 52a. The first arms 51 and 52 and second arms 53 and 54 constitute an arm portion 55 for elastically supporting the gimbal portion 30.

Figure 8:
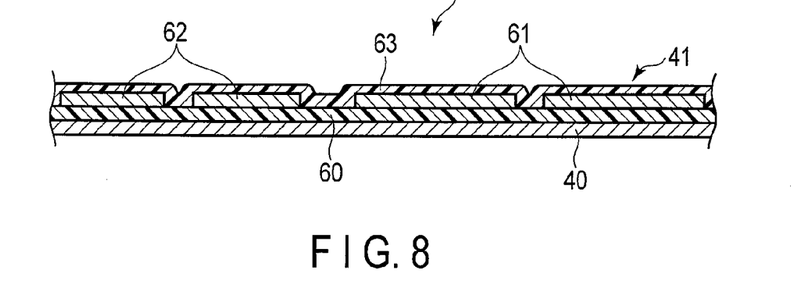
FIG. 8 is a partial sectional view of a conductive circuit portion of a flexure of the suspension.

FIG. 8 shows an example of cross-sections of the metal base 40 and conductive circuit portion 41. The conductive circuit portion 41 comprises an insulating layer 60, write conductors 61, read conductors 62, and cover layer 63. The insulating layer 60 and cover layer 63 are made of an electrically insulating resin, such as polyimide. The conductors 61 and 62 are formed on the insulating layer 60. The cover layer 63 covers the conductors 61 and 62. The write and read conductors 61 and 62 are connected to the elements 28 of the slider 11. For example, the metal base 40 is 20 μm (12 to 25 μm) thick; insulating layer 60, 10 μm (5 to 20 μm) thick; conductors 61 and 62, 9 μm (4 to 15 μm) thick; and cover layer 63, 5 μm (2 to 10 μm). The thickness of the metal base 40 is smaller than that (e.g., 30 μm) of the load beam 21.

The pair of microactuator elements 31 and 32 are disposed on the gimbal portion 30 of the flexure 22. The gimbal portion 30 comprises a first surface 30a (FIGS. 5 and 10) facing the load beam 21 and a second surface 30b (FIGS. 4 and 10) opposite to the first surface 30a. The slider 11 and microactuator elements 31 and 32 are disposed on the second surface 30b.

Microactuator elements 31 and 32 comprise first end portions 31a and 32a and second end portions 31b and 32b, respectively. Arrows X1 and X2 in FIGS. 4, 6 and 7 indicate forward and rearward directions, respectively, with respect to microactuator elements 31 and 32. The first end portions 31a and 32a of microactuator elements 31 and 32 are secured to a pair of first supporting portions 70 and 71, respectively, formed on the gimbal portion 30. The first supporting portions 70 and 71 connect with the first stationary part 22a of the flexure 22 through the flexible first arms 51 and 52, respectively. The distal end portions 51a and 52a of the first arms 51 and 52 connect with the second stationary part 22b of the flexure 22 through the second arms 53 and 54, respectively. Thus, the first supporting portions 70 and 71 are supported on the stationary parts 22a and 22b by the arm portion 55 that can be elastically deformed relative to the load beam 21. The arm portion 55 comprises the first arms 51 and 52 and second arms 53 and 54. The second end portions 31b and 32b of the microactuator elements 31 and 32 are secured to a pair of second supporting portions 72 and 73, respectively, formed on the gimbal portion 30.

Figure 9:
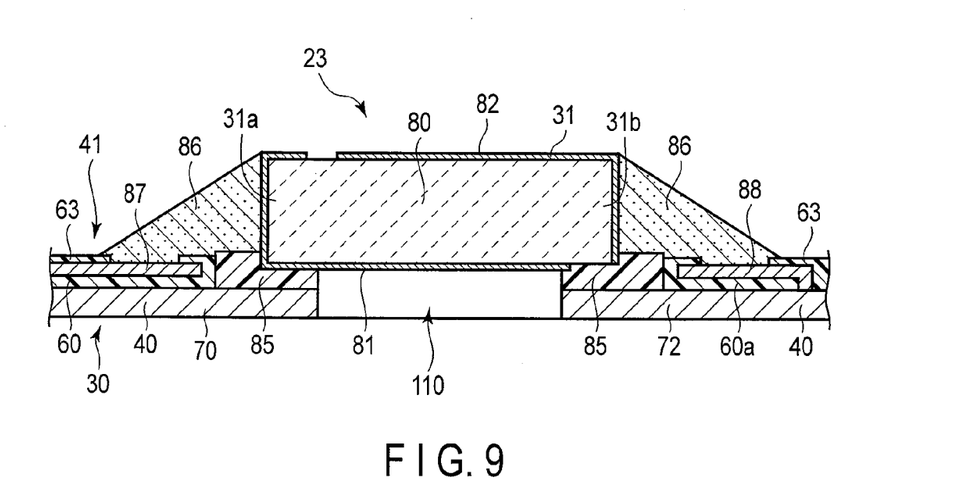
FIG. 9 is a sectional view of the microactuator mounting section of FIG. 4.

FIG. 9 shows cross-sections of joint portions of the one microactuator element 31 (of the pair of microactuator elements 31 and 32). The opposite end portions 31a and 31b of microactuator element 31 are secured to the gimbal portion 30 and electrically connected to the conductive circuit portion 41 by the joint portions. Since joint portions at the opposite end portions 32a and 32b of the other microactuator element 32 are constructed in the same manner as those shown in FIG. 9, the one microactuator element 31 will be representatively described below.

As shown in FIG. 9, microactuator element 31 comprises a PZT element 80 and first and second electrodes 81 and 82 formed on the peripheral surface of the PZT element 80. The first electrode 81 is formed ranging from one end surface of the PZT element 80 to the lower surface thereof. The second electrode 82 is formed ranging from the other end surface of the PZT element 80 to the upper surface thereof. The first end portion 31a of microactuator element 31 is secured to the first supporting portion 70 of the gimbal portion 30 by an electrically insulating adhesive layer 85. The second end portion 31b of microactuator element 31 is secured to the second supporting portion 72 by another adhesive layer 85.

The first electrode 81 shown in FIG. 9 conducts to conductor 87 of the conductive circuit portion 41 through an electrically conductive adhesive layer (for example, silver paste) 86 on the first supporting portion 70. The second electrode 82 conducts to a ground-side conductor 88 through another adhesive layer (for example, silver paste) 86 on the second supporting portion 72. The ground-side conductor 88 is secured to and conducts to the metal base 40.

As shown in FIGS. 5 and 6, the gimbal portion 30 of the flexure 22 comprises a first tongue portion 91 on the stationary side, a movable second tongue portion 92, and a hinge portion 93 formed between the tongue portions 91 and 92. The first tongue portion 91 is formed between the first supporting portions 70 and 71, and the second tongue portion 92 between the second supporting portions 72 and 73. The hinge portion 93 is formed between the first and second tongue portions 91 and 92. The first supporting portions 70 and 71, second supporting portion 72, first and second tongue portions 91 and 92, and hinge portion 93 all constitute a part of the metal base 40, and their respective contours are formed by, for example, etching. The first and second tongue portions 91 and 92 and hinge portion 93 constitute a tongue 90 configured to carry the slider 11 thereon.

As shown in FIG. 7, the conductive circuit portion 41 diverges left and right and passes above the first and second tongue portions 91 and 92. Terminals 41a for the slider 11 are formed on the distal end of the conductive circuit portion 41. These terminals 41a conduct to the conductors 61 and 62 of the conductive circuit portion 41 and are electrically connected to the elements 28 (FIG. 4) of the slider 11. The conductors 87 for microactuator elements 31 and 32 are provided individually on the opposite sides, left and right, of the conductive circuit portion 41. On the first supporting portions 70 and 71, the conductors 87 are connected individually to the respective electrodes 81 of the microactuator elements 31 and 32.

The conductive circuit portion 41 comprises first and second wiring pattern portions 41b and 41c. The first wiring pattern portion 41b is disposed between microactuator elements 31 and 32. The second wiring pattern portion 41c extends rearwardly relative to the gimbal portion 30 from the first wiring pattern portion 41b. A curved portion 41d is formed on a longitudinal part of the second wiring pattern portion 41c. The curved portion 41d serves to reduce the bending stiffness of the conductive circuit portion 41 between the first arms 51 and 52.

Thus, the conductive circuit portion 41 comprises the first wiring pattern portion 41b disposed between the pair of microactuator elements 31 and 32. The first wiring pattern portion 41b passes between microactuator elements 31 and 32. The first wiring pattern portion 41b extends rearwardly relative to the gimbal portion 30 from the leading-side portion 11a of the slider 11. The hinge portion 93 is provided between microactuator elements 31 and 32. In other words, the first wiring pattern portion 41b passes on each side of the hinge portion 93 and extends longitudinally relative to the gimbal portion 30. Further, the first wiring pattern portion 41b is secured to the first and second tongue portions 91 and 92 through the insulating layer 60 of polyimide or the like.

Figure 10:
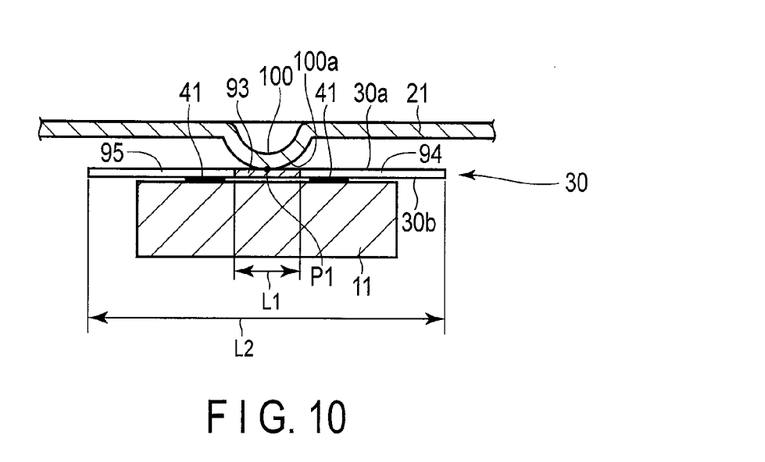
FIG. 10 is a sectional view showing a dimple on a load beam and a part of a gimbal portion.
Figure 11:
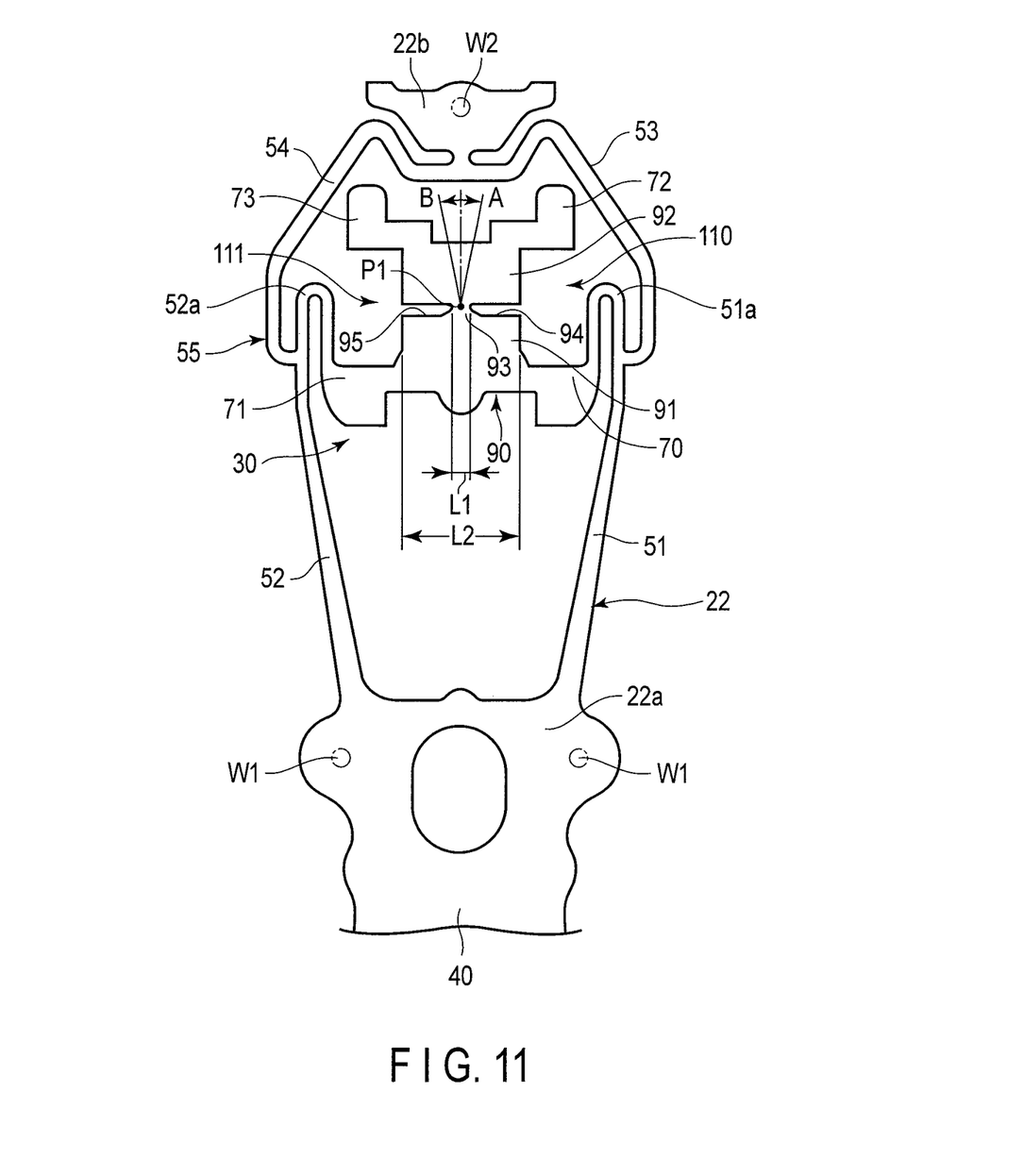
FIG. 11 is a plan view of the gimbal portion of the flexure of the microactuator mounting section of FIG. 5.

FIG. 10 is a partial sectional view of the load beam 21 and gimbal portion 30 taken at the location of the hinge portion 93. FIG. 11 is a plan view of the gimbal portion 30. Width L1 of the hinge portion 93 is sufficiently smaller than width L2 of each of the first and second tongue portions 91 and 92. Slits 94 and 95 are formed between the tongue portions 91 and 92 on the opposite sides of the hinge portion 93, individually. The tongue portions 91 and 92 are relatively pivotably connected together by the constricted hinge portion 93. Thus, the movable second tongue portion 92 is configured to move relative to the first tongue portion 91 on the stationary side in the directions indicated by arrows A and B in FIG. 11.

The slider 11 is disposed on the first and second tongue portions 91 and 92 and hinge portion 93. Further, a leading-side portion 11a of the slider 11 is disposed for movement relative to the first tongue portion 91. A trailing-side portion 11b of the slider 11 is secured to the second tongue portion 92. The "leading side" stated herein is the side where air flows in between the slider 11 and disk 4 as the disk rotates. On the other hand, the "trailing side" is the side where air between the slider 11 and disk 4 comes out. The hinge portion 93 is formed in a center position 11c of the slider 11, e.g., the center of gravity of the slider 11 or the center thereof with respect to both transverse and longitudinal directions.

A dimple 100 (FIG. 10) is formed near the distal end of the load beam 21. The dimple 100 comprises a supporting protrusion 100a formed of a convex surface projecting toward the gimbal portion 30. The distal end of the supporting protrusion 100a abuts the hinge portion 93. In other words, the hinge portion 93 is swingably supported by the convex surface of the dimple 100. Thus, the gimbal portion 30 is supported for swinging motion relative to the load beam 21 about a point of contact P1 between the hinge portion 93 and the distal end of the dimple 100.

Alternatively, a dimple may be formed on the hinge portion 93 such that its distal end abuts the load beam 21. In short, the supporting protrusion 100a, such as the dimple, should only be formed on one of the respective facing surfaces of the load beam 21 and hinge portion 93 so that it abuts the other facing surface.

One opening 110 (on the right-hand side of FIG. 11) is formed between the first and second supporting portions 70 and 72. Opening 110 communicates with the one slit 94. The other opening 111 (on the left-hand side of FIG. 11) is formed between the first and second supporting portions 71 and 73. Opening 111 communicates with the other slit 95.

Since openings 110 and 111 are thus formed on the opposite sides of the tongue portions 91 and 92, respectively, front-rear (or longitudinal) intermediate portions of the elements 31 and 32 can be prevented from contacting the tongue portions 91 and 92. If the suspension 10 is subjected to external mechanical shock, therefore, the longitudinal intermediate portions of the elements 31 and 32 can be prevented from being struck by the tongue portions 91 and 92. Thus, the elements 31 and 32 can be prevented from being damaged by being struck. The longitudinal direction of microactuator elements 31 and 32 stated herein is the direction of the extending and contracting strokes of microactuator elements 31 and 32.

Microactuator mounting section 23 of the present embodiment comprises limiter members 120 and 121. These limiter members 120 and 121 have the function of keeping the tongue portions 91 and 92 from excessively vibrating when the suspension 10 is subjected to external mechanical shock. The limiter members 120 and 121 also have the function of keeping the hinge portion 93 from separating from the dimple 100 (dimple separation).

Figure 12:
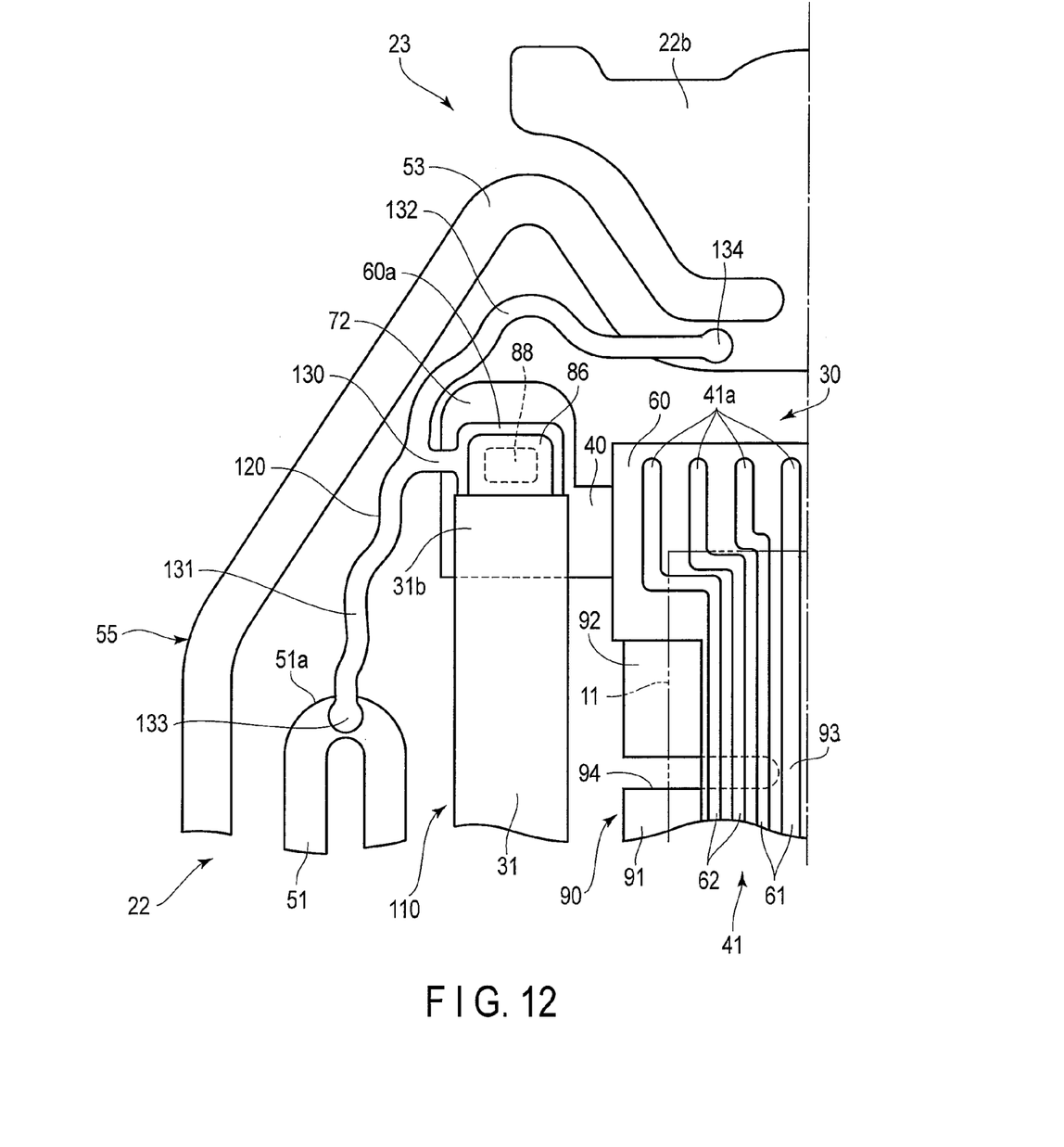
FIG. 12 is a partial enlarged bottom view of the microactuator mounting section of FIG. 7.

FIG. 12 shows the limiter member 120 (of the pair of limiter members 120 and 121) on the left-hand side of FIG. 7. The other limiter member 121 is constructed in the same manner as the one limiter member 120 shown in FIG. 12 provided that they are bilaterally symmetrical. Therefore, the one limiter member 120 will be representatively described below. In FIG. 12 showing the conductive circuit portion 41, illustration of the cover layer (FIG. 8) is omitted.

The limiter member 120 shown in FIG. 12 is made of the electrically insulating resin shared with the insulating layer 60 (FIGS. 8 and 9) of the conductive circuit portion 41. An example of the resin is polyimide. The limiter member 120 is contoured as shown in FIG. 12 by being etched together with the insulating layer 60 as the insulating layer 60 is formed. Alternatively, a limiter member of a predetermined shape may be formed by, for example, applying a resin to a masked metal base.

The limiter member 120 comprises a grounding junction 130, first bridge portion 131, and second bridge portion 132. The grounding junction 130 is secured to the second supporting portion 72. The second supporting portion 72 comprises the ground-side conductor 88. The first bridge portion 131 extends in a first direction (or rearwardly relative to the gimbal portion 30) from the grounding junction 130. The second bridge portion 132 extends in a second direction (or forwardly relative to the gimbal portion 30) from the grounding junction 130. The grounding junction 130 extends outwardly relative to the gimbal portion 30 from a part 60a of the insulating layer 60. The part 60a of the insulating layer 60 is formed on the second supporting portion 72.

A distal end (rear end) 133 of the first bridge portion 131 is connected to the distal end portion 51a of the first arm 51. A distal end (front end) 134 of the second bridge portion 132 is connected to the second arm 53. The first and second bridge portions 131 and 132 are undulating as viewed from above the gimbal portion 30. This shape of the limiter member 120 does not hinder the motion of microactuator elements 31 and 32 that are driven by application of a voltage.

The grounding junction 130 and the respective distal ends 133 and 134 of the first and second bridge portions 131 and 132 are individually secured to the metal base 40 by the adhesivability of the resin of the insulating layer 60. As shown in FIG. 9, the second supporting portion 72 is formed with the ground-side conductor 88. The ground-side conductor 88 electrically connects the metal base 40 and the second electrode 82 of microactuator element 31. The grounding junction 130 is secured to the metal base 40 in such a manner that it is sandwiched between the metal base 40 and ground-side conductor 88 at the second supporting portion 72.

The following is a description of the operation of the suspension 10 of the present embodiment.

If the carriage 6 (FIGS. 1 and 2) is turned by the positioning motor 7, the suspension 10 moves radially relative to the disk 4. Thereupon, the slider 11 of the magnetic head moves to a desired track of the recording surface of the disk 4. If a voltage is applied to microactuator elements 31 and 32, microactuator elements 31 and 32 are oppositely distorted relative to each other as to the voltage. In this way, the load beam 21 can be moved by an infinitesimal distance in the sway direction (indicated by arrow Y in FIG. 3).

Figure 13:
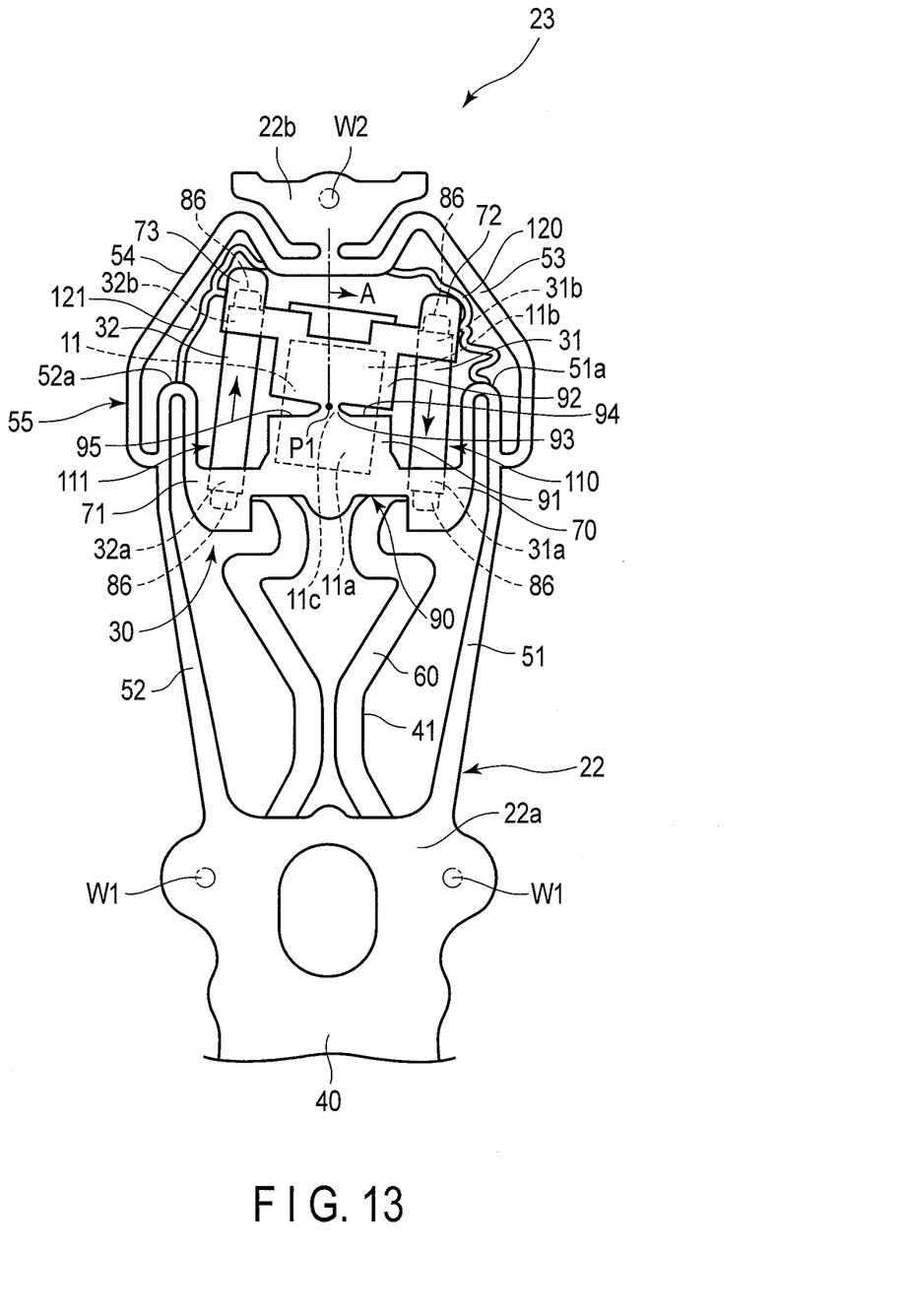
FIG. 13 is a plan view schematically showing the microactuator mounting section with microactuator elements actuated.

As schematically shown in FIG. 13, for example, the second tongue portion 92 moves in the direction of arrow A as the one and the other microactuator elements 31 and 32 contract and extend, respectively. Thus, the elements 28 (FIG. 4) on the slider 11 can be quickly precisely positioned in the sway direction. Actually, the movement distance of the slider 11 in the sway direction ranges from several nm to several tens of nm. In FIG. 13, however, the degree of deformation of the gimbal portion 30 is exaggeratively indicated for better understanding of the movements of the slider 11 and second tongue portion 92.

In the microactuator mounting section 23 of the present embodiment, the movable second tongue portion 92 pivots transversely about the hinge portion 93, with respect to the first tongue portion 91 on the stationary side, if microactuator elements 31 and 32 are driven. The trailing-side portion 11b of the slider 11 is secured to the second tongue portion 92. In contrast, the leading-side portion 11a of the slider 11 is movable relative to the first tongue portion 91. As shown in FIG. 10, the distal end of the dimple 100 abuts the hinge portion 93 at the point of contact P1.

If the microactuator elements 31 and 32 are driven by application of a voltage, therefore, the second tongue portion 92 and slider 11 pivot about the point of contact P1 with the dimple 100. Thus, the pivot center of the slider 11 can be matched with the position of the contact point P1. In this way, the distal end of the dimple 100 can be kept from rubbing against the flexure 22 when microactuator elements 31 and 32 are driven (or when the slider 11 is pivoted). Thus, production of high frictional resistance or a causative agent of contamination during the pivoting motion of the second tongue portion 92 can be suppressed.

In addition, microactuator elements 31 and 32 are disposed on the second surface 30b of the gimbal portion 30 on the same side as the slider 11. Therefore, the thickness of each of microactuator elements 31 and 32 need not be made smaller than the projection height of the dimple 100. Accordingly, thick structures can be used for microactuator elements 31 and 32. Thus, the available microactuator elements 31 and 32 provide high output load and mechanical strength and are hard to break.

As described above, the first wiring pattern portion 41b is disposed between microactuator elements 31 and 32. The first wiring pattern portion 41b passes on each side of the hinge portion 93 and extends longitudinally relative to the gimbal portion 30. Specifically, the first wiring pattern portion 41b passes near the contact point P1 of the hinge portion 93 where the driven microactuator elements 31 and 32 move little. The second wiring pattern portion 41c extends rearwardly relative to the gimbal portion 30 from between microactuator elements 31 and 32.

In the microactuator mounting section 23 comprising the conductive circuit portion 41 constructed in this manner, the driven elements 31 and 32 move less than in a conventional version in which a conductive circuit portion is disposed outside microactuator elements. Accordingly, the conductive circuit portion 41 can be kept from being tensioned or flapping while the elements 31 and 32 are driven. In addition, the conductive circuit portion 41 is not located above the elements 31 and 32, so that the elements 31 and 32 can be prevented from being damaged by contact with the conductive circuit portion 41.

As shown in FIG. 9, the ground-side conductor 88 is provided on the second supporting portion 72. The ground-side conductor 88 electrically connects the metal base 40 and the second electrode 82 of the microactuator element 31. The ground-side conductor 88 is secured to the metal base 40. Accordingly, the grounding junction 130 of the limiter member 120 is firmly secured by the ground-side conductor 88 and the metal base 40 at the second supporting portion 72. Thus, the grounding junction 130 cannot be easily separated from the metal base 40 at the second supporting portion 72. If the second tongue portion 92 pivots with the element 31 driven or is externally jolted, stress is repeatedly applied to the grounding junction 130. Despite this stress, the grounding junction 130 cannot be easily separated from the second supporting portion 72.

Figure 14:
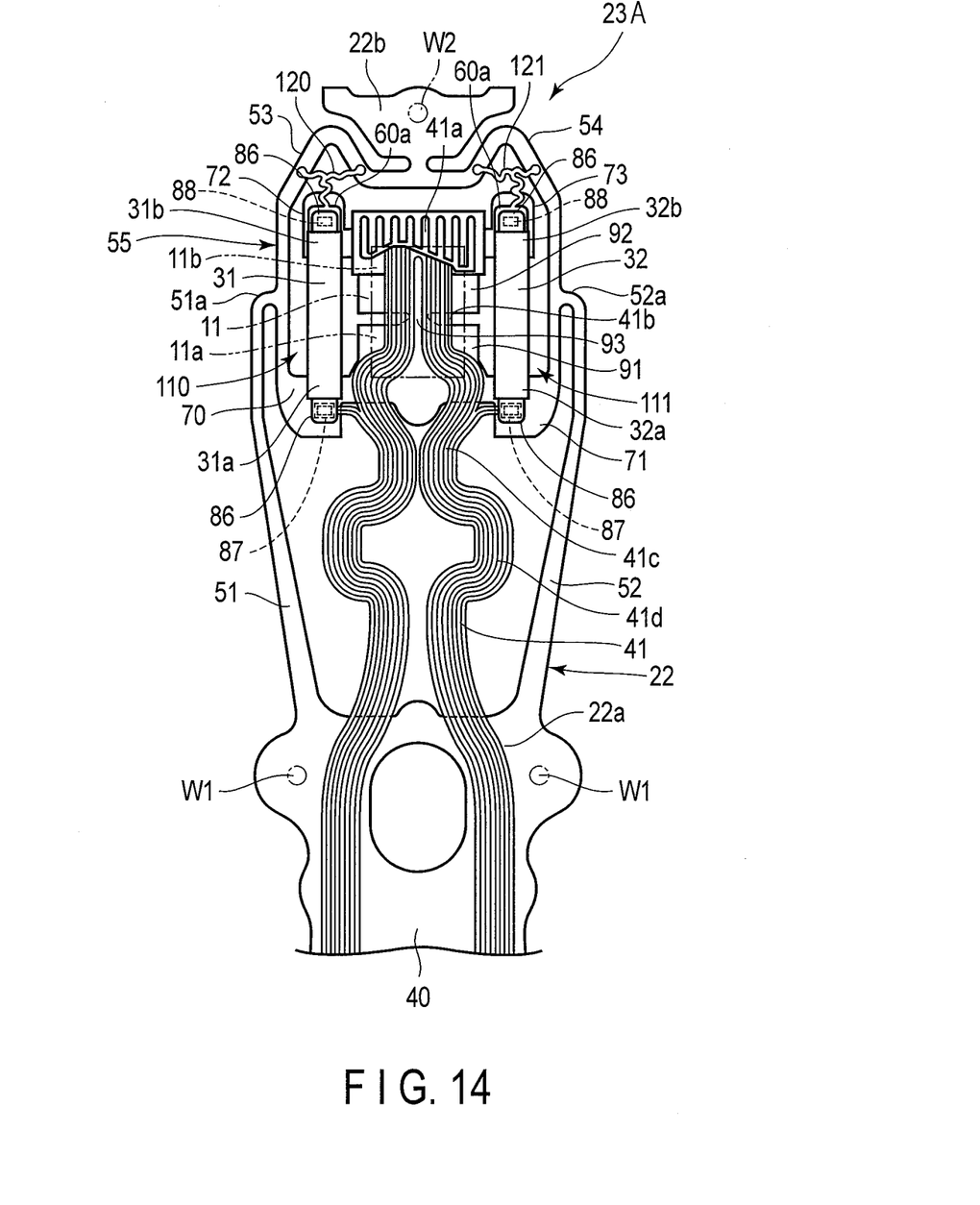
FIG. 14 is a bottom view of a microactuator mounting section according to a second embodiment.

FIG. 14 shows a microactuator mounting section 23A according to a second embodiment. Microactuator mounting section 23A of this embodiment is slightly different from microactuator mounting section 23 of the first embodiment in the forms of first arms 51 and 52 and second arms 53 and 54. Specifically, the second arms 53 and 54 of microactuator mounting section 23A of FIG. 14 are located inside the first arms 51 and 52, respectively. Further, respective distal end portions 51a and 52a of the first arms 51 and 52 are connected to the second arms 53 and 54, respectively. Limiter members 120 and 121 are connected to second supporting portions 72 and 73 and the second arms 53 and 54, respectively. Since other configurations and effects are common to microactuator mounting sections 23 and 23A of the first and second embodiments, common numbers are used to designate common portions of the first and second embodiments, and a description of those portions is omitted.

Figure 15:
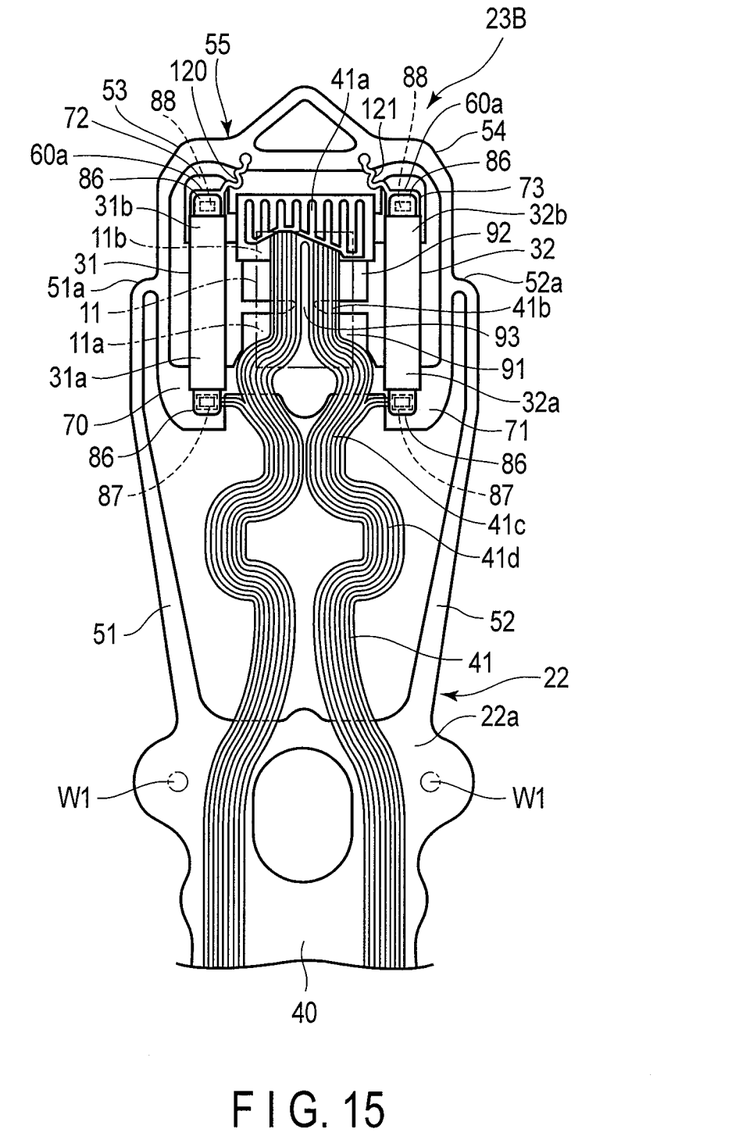
FIG. 15 is a bottom view of a microactuator mounting section according to a third embodiment.

FIG. 15 shows a microactuator mounting section 23B according to a third embodiment. Second arms 53 and 54 of this embodiment are connected to first arms 51 and 52, respectively. The second arms 53 and 54 are not secured to a load beam. First supporting portions 70 and 71, a first tongue portion 91, and the second arms 53 and 54 are supported on a stationary part 22a of a flexure 22 by the first arms 51 and 52. Limiter members 120 and 121 are provided spanning between second supporting portions 72 and 73 and the second arms 53 and 54, respectively. Since other configurations and effects are common to microactuator mounting sections 23 and 23B of the first and third embodiments, common numbers are used to designate common portions of the first and third embodiments, and a description of those portions is omitted.

It is to be understood, in carrying out the present invention, that the specific forms of the constituent elements of the microactuator mounting section, including the tongue of the flexure and the first and second supporting portions, as well as the shapes, arrangement, etc., of the limiter members and microactuator elements, may be modified variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension which comprises a load beam and a flexure, the flexure being formed of a metal base and comprising a stationary part secured to the load beam and a gimbal portion on which a slider is mounted, the disk drive suspension further comprising:
   a pair of microactuator elements disposed on either side of the slider and each comprising a first end portion and a second end portion;
   an arm portion of the flexure connecting with the stationary part;
   a pair of first supporting portions of the gimbal portion to which the first end portions of the pair of microactuator elements are individually secured, the pair of first supporting portions being supported by the arm portion;
   a pair of second supporting portions of the gimbal portion to which the second end portions of the pair of microactuator elements are individually secured;
   a tongue on which the slider is mounted;
   a supporting protrusion swingably supporting the tongue relative to the load beam;
   a conductive circuit portion comprising an insulating layer of an electrically insulating resin and a conductor formed on the insulating layer;
   ground-side conductors which are provided individually on the second supporting portions and electrically conduct to the metal base of the flexure;

electrically conductive adhesive layers which are provided between respective electrodes of the microactuator elements and the respective ground-side conductors individually on the second supporting portions and which electrically conduct to the respective electrodes and the respective ground-side conductors; and limiter members each comprising (i) a grounding junction secured to both a respective one of the electrically conductive adhesive layers and a respective one of the ground-side conductors at a respective one of the second supporting portions corresponding thereto and (ii) a bridge portion extending outwardly relative to the tongue from the grounding junction and being connected to the arm portion.

2. The disk drive suspension of claim 1, wherein the limiter members consist mainly of the resin shared with the insulating layer.

3. The disk drive suspension of claim 2, wherein the respective grounding junctions of the limiter members integrally connect with the insulating layer on the second supporting portions.

4. The disk drive suspension of claim 3, wherein each of the limiter members comprises a first bridge portion and a second bridge portion extending in first and second directions, respectively, from the grounding junction and being connected to the arm portion.

5. The disk drive suspension of claim 2, wherein each of the limiter members comprises a first bridge portion and a second bridge portion extending in first and second directions, respectively, from the grounding junction and being connected to the arm portion.

6. The disk drive suspension of claim 1, wherein each of the limiter members comprises a first bridge portion and a second bridge portion extending in first and second directions, respectively, from the grounding junction and being connected to the arm portion.

7. The disk drive suspension of claim 1, wherein the tongue comprises:
- a first tongue portion which is formed between the pair of first supporting portions and on which a leading-side portion of the slider is disposed for movement;
- a second tongue portion which is formed between the pair of second supporting portions and to which a trailing-side portion of the slider is secured; and
- a hinge portion which is formed between the first and second tongue portions, is narrower than the tongue portions, and pivotably connects the tongue portions.

8. The disk drive suspension of claim 7, wherein the supporting protrusion is a convex surface of a dimple formed on the load beam, the convex surface of the dimple abutting the hinge portion.

* * * * *